Dec. 30, 1941.  W. J. KELLY  2,268,286
BRAKE SHOE
Filed Dec. 14, 1938   5 Sheets-Sheet 1

INVENTOR.
WALTER J. KELLY.
BY John E. Jackson
ATTORNEY

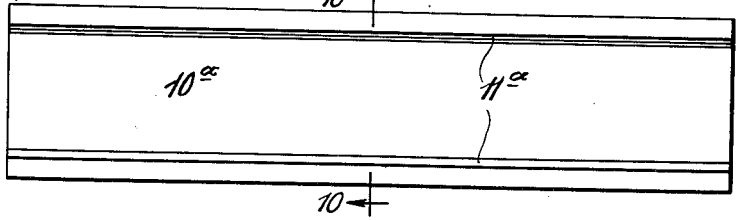
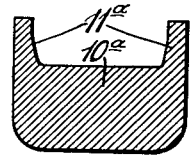
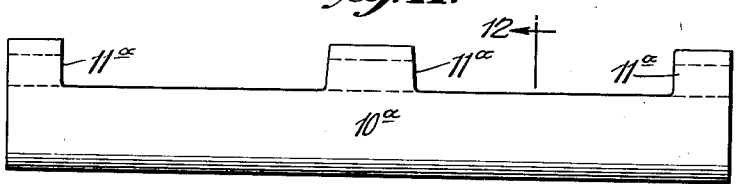
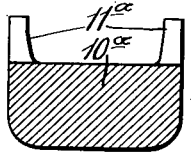
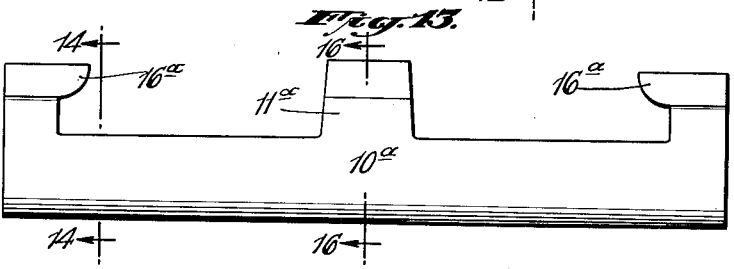
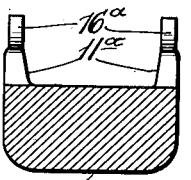
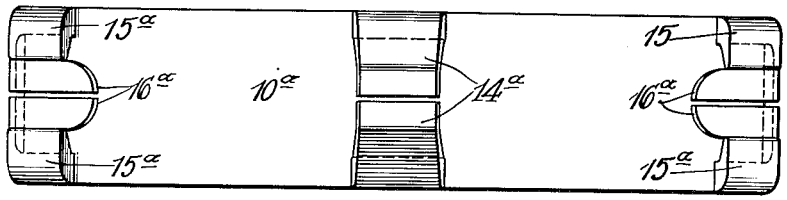
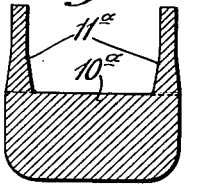
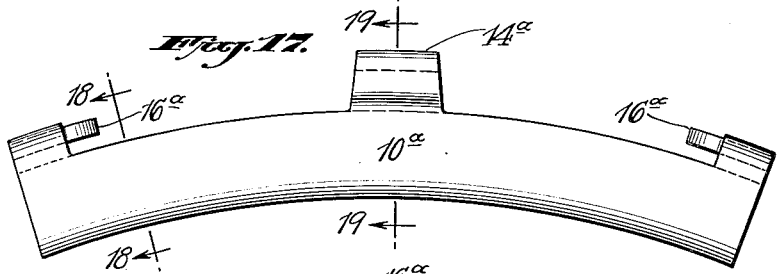
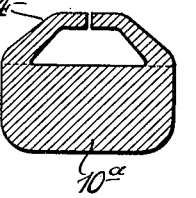
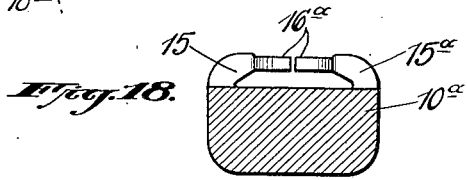

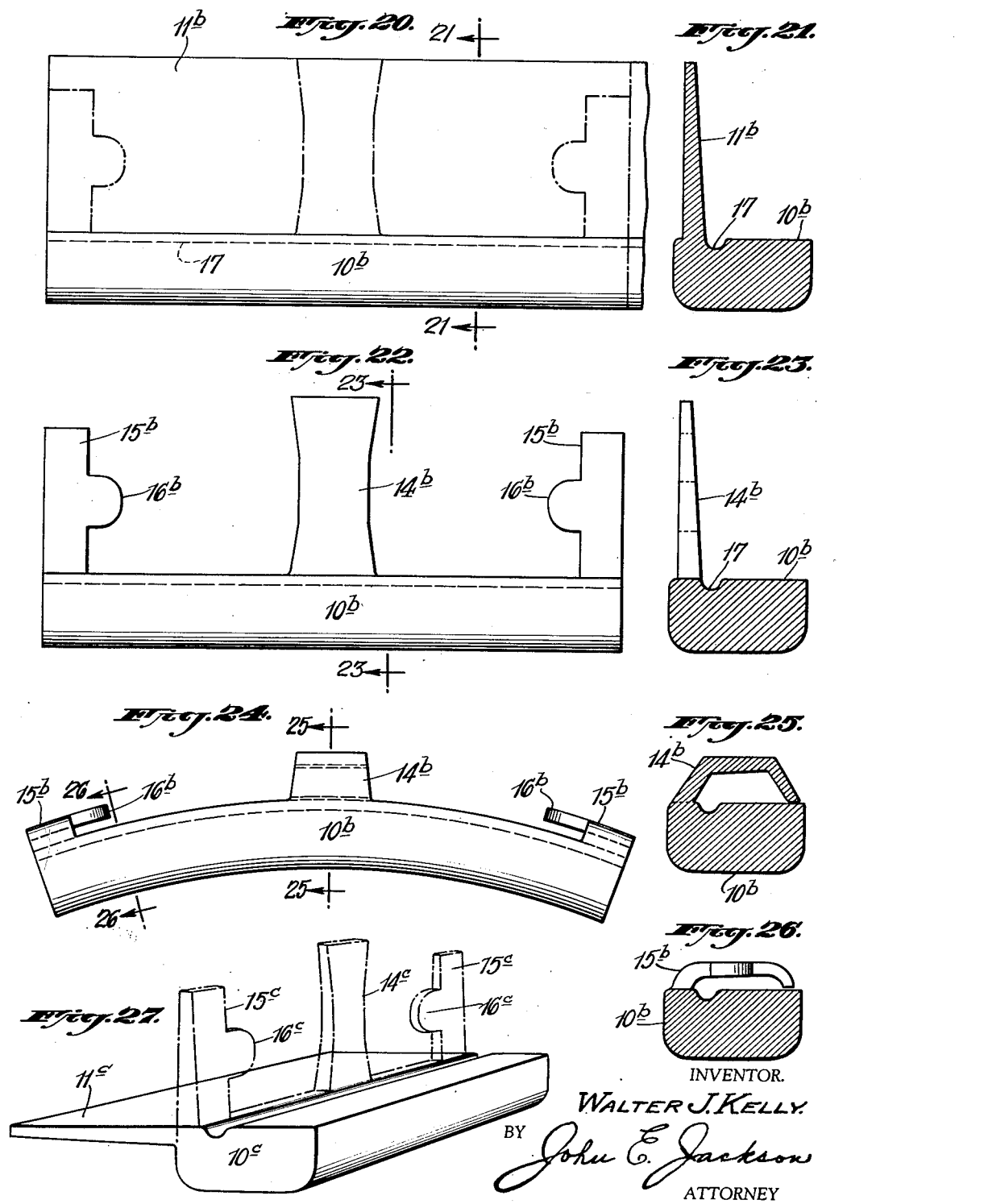

Dec. 30, 1941.                W. J. KELLY                2,268,286
                              BRAKE SHOE
                          Filed Dec. 14, 1938            5 Sheets-Sheet 4
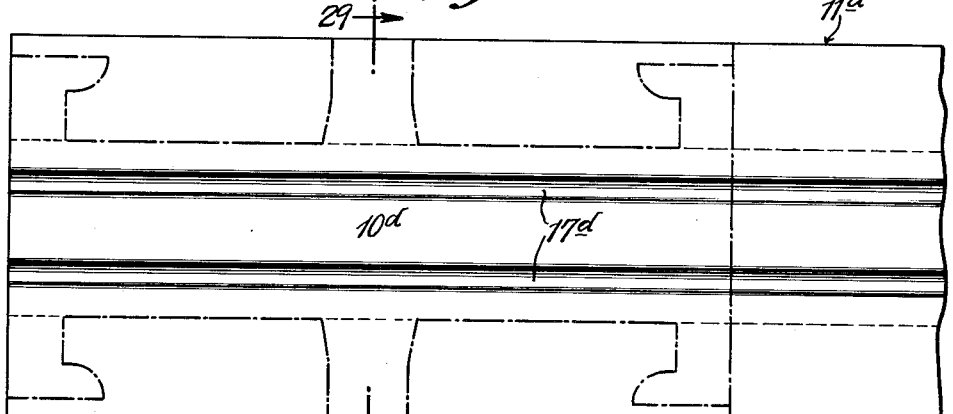
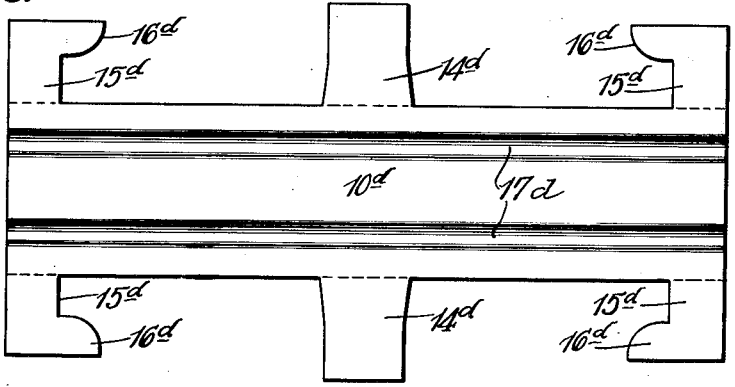
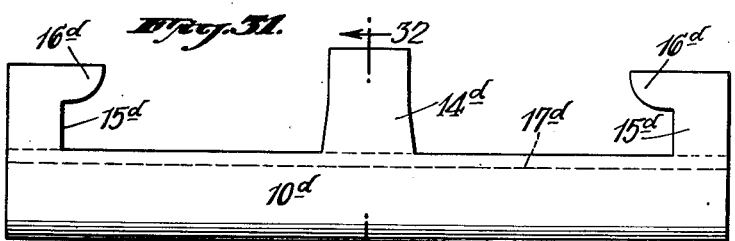
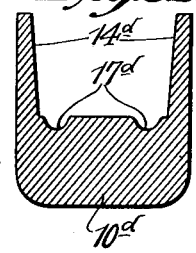
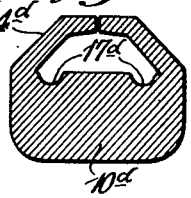
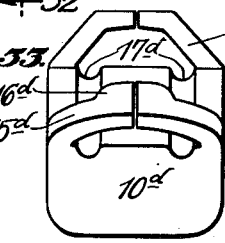
INVENTOR.
WALTER J. KELLY.
BY John E. Jackson
ATTORNEY

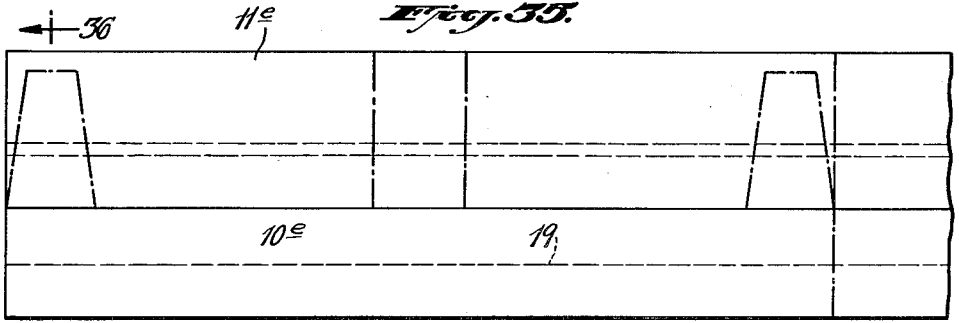
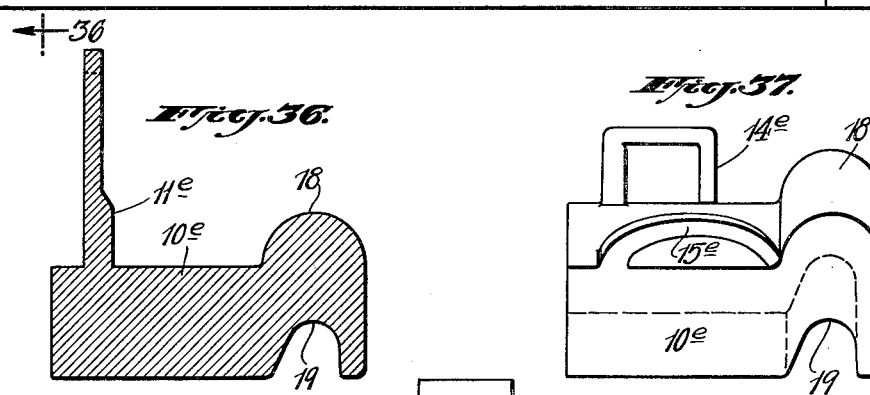
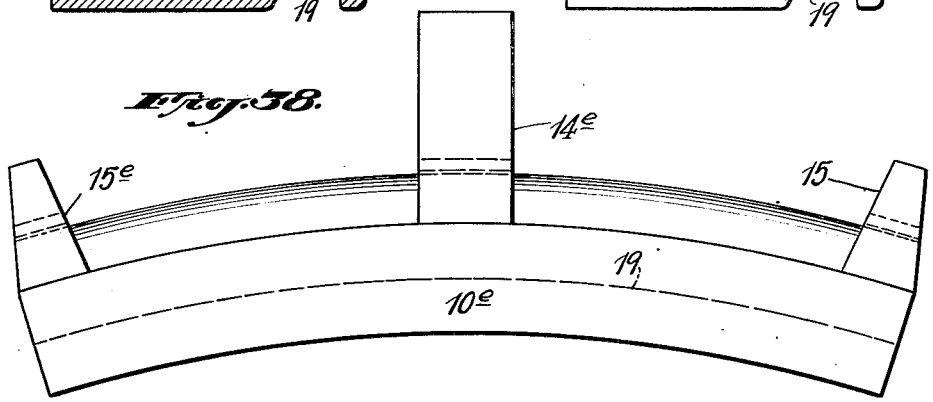
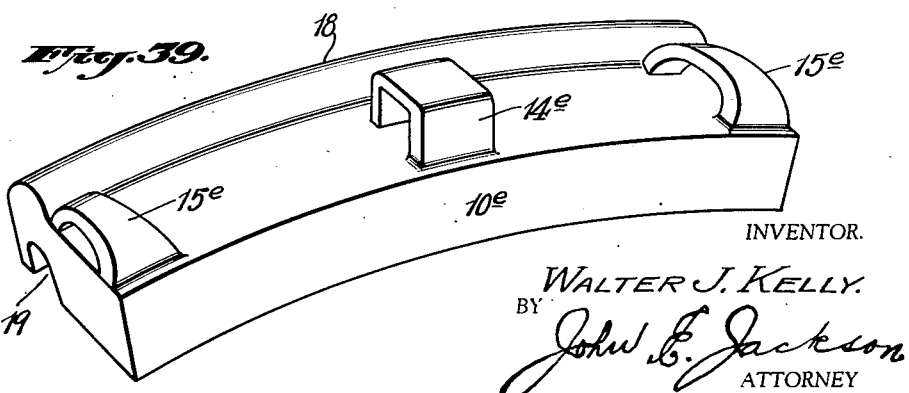

Patented Dec. 30, 1941

2,268,286

UNITED STATES PATENT OFFICE 2,268,286

BRAKE SHOE

Walter J. Kelly, Birmingham, Ala.

Application December 14, 1938, Serial No. 245,762

2 Claims. (Cl. 188—250)

This invention relates to improvements in brake shoes and to a novel process for the production of the same.

In a prior Patent No. 1,592,273, granted to me on July 13, 1926, I have disclosed a brake shoe and a method of making the same, wherein the brake shoe comprised a section of rolled bar having a transverse cross section of the brake shoe and provided with rolled integral webs on its convex surface disposed and deformed to provide the mounting elements for the shoe. My present invention relates to detailed features of improvement over the structure and method disclosed in the prior patent. The outstanding distinguishing features over my prior patent are referred to briefly as follows, but will be elaborated on more fully as the description proceeds.

(1) The webs in the present instance are formed nearer the outer edges of the brake shoe and they are of tapered form so as to give greater strength nearer the base and also to facilitate rolling operations. And said webs are so formed as to provide overhanging projections for the alignment lugs.

(2) After shearing portions of the web they are bulldozed or swaged to increase the height.

(3) Depressions are formed during the rolling operation adjacent the base of the webs to facilitate bending operations.

(4) In certain instances, the brake shoe blanks are rolled with webs of relatively thin cross section disposed in a plane substantially coincident with one face of the brake shoe blank.

These and other more detailed distinguishing features will be more fully pointed out hereinafter. Certain alternative embodiments of the invention are illustrated in the accompanying drawings, in which—

Figure 1:
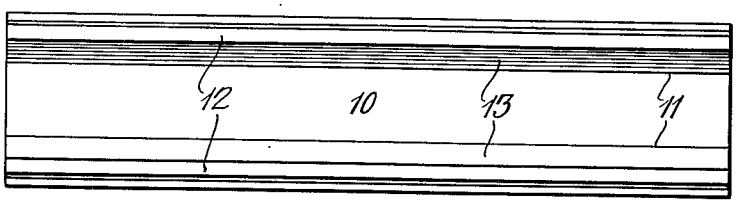
Figure 2:
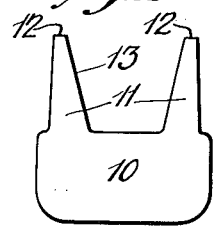
Figure 3:
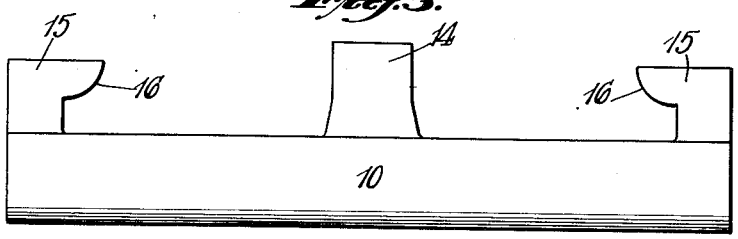
Figure 4:
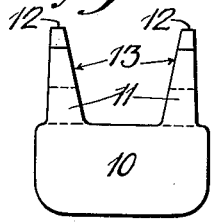
Figure 5:
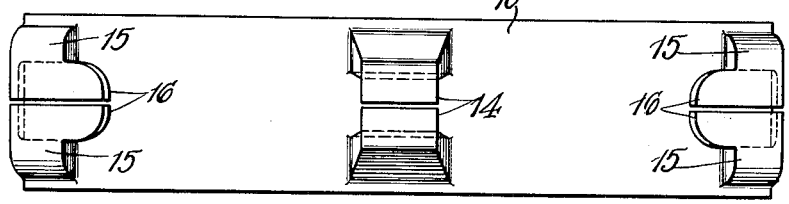
Figure 6:
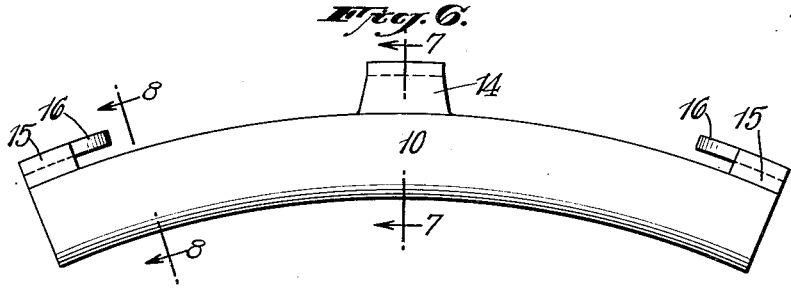
Figure 8:
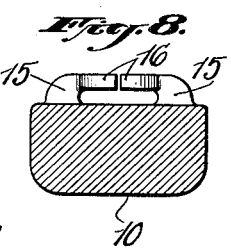
Figure 7:
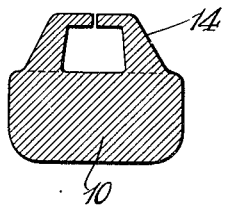

Figs. 1 and 2 illustrate a rolled steel blank in plan and end view respectively; Figs. 3 and 4 illustrate the same blank after having been subjected to a shearing operation; Figs. 5 and 6 represent a plan and side elevation of the shoe formed from the blank of Figs. 1 to 4 inclusive; Figs. 7 and 8 are transverse sectional views on the correspondingly numbered lines of Fig. 6; Figs. 9 and 10 are respectively a plan view and a section on line 10—10 of a modified form of blank; Figs. 11 and 12 illustrate the blank of Figs. 9 and 10 after the same has been subjected to a shearing operation; Figs. 13 and 14 illustrate the blank of Fig. 11 after having been subjected to a swaging or bulldozing operation; Fig. 15 is a plan view of the brake shoe made from the blank of Figs. 9 to 14 inclusive; Fig. 16 is a cross section on line 16—16 of Fig. 13; Fig. 17 is a side elevation of the brake shoe of Fig. 15; Figs. 18 and 19 are cross sections on the correspondingly numbered lines of Fig. 17; Figs. 20 and 21 are side view and cross section respectively of the modified form of rolled brake shoe blank, Fig. 21 being a section on the correspondingly numbered line of Fig. 20; Fig. 22 illustrates the blank of Fig. 20 after having been subjected to a shearing operation; Fig. 23 is a cross section on the correspondingly numbered line of Fig. 22; Fig. 24 is a side elevation of a brake shoe made from the blank of Figs. 20 to 23 inclusive; Figs. 25 and 26 are sectional views on the correspondingly numbered lines of Fig. 24; Fig. 27 is a modified form of blank with the portions shown in dotted lines representing the web thereof after having been sheared and subjected to a preliminary bending operation; Fig. 28 is a further modified form of blank wherein the pair of thin web portions are disposed in the horizontal plane of the body portion; Fig. 29 is a cross section on the correspondingly numbered line of Fig. 28; Fig. 30 illustrates the blank of Fig. 28 after its web portions have been sheared along the broken lines of Fig. 28; Fig. 31 illustrates the blank of Fig. 30 after having been subjected to a preliminary bending operation; Fig. 32 is a cross section on the correspondingly numbered line of Fig. 31; Fig. 33 is an end view of the brake shoe formed from the blank of Figs. 28 to 32 inclusive; Fig. 34 is a cross sectional view taken through the key lug of the brake shoe shown in Fig. 33; Fig. 35 is a side elevation of a blank of modified form characterized by the provision of the deformed portion to provide for a wheel flange receiving recess; Fig. 36 is a cross section on the correspondingly numbered line of Fig. 35; Fig. 37 is an end elevation of the brake shoe formed from the blanks of Figs. 35 and 36; Fig. 38 is a side elevation of the blank of Fig. 36 after having been subjected to shearing operations and the bending operation to form the desired radius; Fig. 39 is a perspective view of the brake shoe formed from the blank shown in Fig. 38.

Referring first to Figs. 1 to 7 inclusive, I have here illustrated a blank having a relatively thick or heavy body portion 10 with upstanding web portions 11—11 which taper from a relatively heavy section adjacent the body 10 toward a thinner section 12 at the outer extremities thereof. This blank contour provides the outwardly flaring side walls 13 which give a good rolling clearance, it being understood that this blank is preferably formed by subjecting a suitable billet to a rolling operation between the working rolls of a conventional type of rolling mill. The web portions 11—11 are subjected to shearing operations so as to shape the blank substantially shown in Fig. 3, thus providing the central key lugs 14 and end retaining lugs 15—15 having overhanging alignment projections 16—16 extending laterally from the outer extremities thereof. The thus formed blank is subjected to bending operations so as to bring the key lugs, retaining lugs and alignment projections into the position shown in Figs. 5 to 8 inclusive. The blank is then bent to a required radius, such as shown for example in Fig. 6, whereupon it is heat treated, thus finishing the operation, and increasing its ability to resist wear.

In Figs. 9 to 18 inclusive, I have illustrated similar type of brake shoe to that above described. But, in this modification the outer web portions 11ª—11ª are of much less height than in the case of Fig. 2 and after the web portions have been sheared to the shape shown in Fig. 11 they are subjected to a swaging or so-called bulldozing operation. This greatly increases the height of the webs and also provides the projecting portions 16ª—16ª which form the alignment projections. This swaging or bulldozing also increases the height from which the portions of the key lugs 14ª are formed. This increase in height effected by the bulldozing operation is apparent by comparing the cross sectional Figs. 10 and 12 with the similar views Figs. 14 and 16, the latter two figures showing the condition after the bulldozing or swaging operation. This method enables me to more readily roll the blank because of the lower or shorter webs required. The resulting brake shoe is illustrated in Figs. 15, 17, 18 and 19.

In the modification of Figs. 20 to 26 inclusive, I start with a blank such as shown in detail in Figs. 20 and 21, wherein the body portion 10ᵇ has disposed perpendicularly to one of its edges a web 11ᵇ of considerably greater height than that shown in Figs. 2 and 10. And adjacent the intersection of this web and the body portion, there is rolled in the blank a depression 17. This depression is rolled in for the express purpose of facilitating a later bending operation. The web 11ᵇ is subjected to a shearing operation along the broken lines of Fig. 20. This will result in the formation of the upstanding portions, such as shown in Figs. 22 and 23 from which the key lug 14ᵇ and retaining lugs 15ᵇ and alignment projections 16ᵇ will be formed. These parts are subjected to bending operations, so as to bring them to the positions shown in Figs. 24, 25 and 26.

After such bending, the body of the blank is bent to the required radius and then heat treated. Fig. 27 illustrates a form of blank wherein the thin web portion 11ᶜ extends laterally in a plane substantially parallel and coincident with one face of the body portion 10ᶜ. The dot and dash lines indicate key lug portion 14ᶜ, retaining lug portions 15ᶜ and lug projections 16ᶜ, which are adapted to be bent to substantially the position of the correspondingly numbered elements in Fig. 24.

In the modification illustrated in Figs. 28 to 33 inclusive, the blank has a central relatively heavy, thick body portion 10ᵈ with laterally extending thinner web portions 11ᵈ—11ᵈ whose upper surfaces are in a plane parallel with and substantially coincident with the body portion and parallel depressions or channels 17ᵈ are provided adjacent the point of juncture of the webs with the body portions so as to facilitate the bending of the webs. After shearing and bending operations similar to those above referred to, the key lug 14ᵈ takes the shape shown in Fig. 33 and the retaining lugs 15ᵈ and alignment projections 16ᵈ take the form such as illustrated in Fig. 33.

In Figs. 35 to 39 inclusive, I have illustrated a further modification in which the relatively thick portion 10ᵉ of the blank has upstanding therefrom a thinner web 11ᵉ which is adapted to be sheared, as indicated by the dot and dash lines in Fig. 35, so as to provide the formation shown in Fig. 38. This blank is provided with a deformed portion 18 during the rolling operation, which portion also during rolling is provided with a longitudinally extending groove 19 adapted for coaction with a flange of a railway car wheel. The key projection 14ᵉ in this modification is bent to the form shown in Figs. 37 and 39.

However in this case, the retaining lugs are formed, as shown at 15ᵉ, without the alignment projections such as shown in the other figures because the provision of the grooved portion 18, which coacts with the wheel flange, eliminates the necessity of providing such alignment projections.

In all of the various embodiments of the invention illustrated, the method of manufacture involves first rolling the steel billet or bloom so as to form a blank of the required cross sectional shape and dimensions. Such blank is then formed to the finished brake shoe by shearing, pressing and bending and heat treating as described in detail. The reduction by rolling of the steel to the finished brake shoe blank produces a brake shoe of great density. I have determined in practice that density is an important factor in the successful use of steel, where wear occurs as a result of sliding friction between coacting parts. In the production of blanks according to the method described in detail, it is a characteristic feature that the blank is rolled in the same direction as the movement of the railway car wheel with which the brake shoe will come into contact when in use. I deem this advantageous, as I have found from experience that where the fibres of the steel run in the same direction as the rubbing contact between the coacting parts the useful life of the brake shoe is increased.

While I have described quite precisely certain structural features of the various embodiments of the invention herein illustrated and have referred to definite steps in the production of the various shoes shown it is to be understood that the drawings and description are to be interpreted in an illustrative rather than a limiting sense and the claims are to be interpreted as broadly as is consistent with the prior state of the art.

What I claim is:

1. A rolled steel brake shoe comprising a relatively thick body of arcuate form and having grooves extending longitudinally from end to end of the shoe, web members whose bases are on the outer sides of said grooves and whose outer portions extend across the grooves and provide mounting elements for the shoe, said grooves serving to facilitate and permit the initial bending of said web members to operative positions in the completed brake shoe without causing an objectionable increase in the cross sectional area in the fillet zones where said web members join said body.

2. A rolled steel brake shoe comprising a relatively thick body of arcuate form, web portions whose bases are substantially coincident with the outer side faces of said body and having their free ends bent inwardly to form mounting elements for the shoe, said free ends having longitudinally extending alignment projections formed thereon.

WALTER J. KELLY.